(12) United States Patent
Hu et al.

(10) Patent No.: US 8,307,122 B2
(45) Date of Patent: Nov. 6, 2012

(54) CLOSE-COUPLING SHARED STORAGE ARCHITECTURE OF DOUBLE-WING EXPANDABLE MULTIPROCESSOR

(75) Inventors: Leijun Hu, Jinan (CN); Yong Dou, Jinan (CN); Guangming Liu, Jinan (CN); Endong Wang, Jinan (CN); Xiangke Liao, Jinan (CN); Jun Luo, Jinan (CN); Hongwei Yin, Jinan (CN); Qingbo Wu, Jinan (CN); Yongwen Wang, Jinan (CN); Shouhao Wang, Jinan (CN); Jiaming Huang, Jinan (CN); Jizhi Zhao, Jinan (CN); Yi Zheng, Jinan (CN)

(73) Assignee: Langchao Electronic Information Industry Co., Ltd. (CN)

( * ) Notice: Subject to any disclaimer, the term of this patent is extended or adjusted under 35 U.S.C. 154(b) by 191 days.

(21) Appl. No.: 12/812,001

(22) PCT Filed: Nov. 3, 2008

(86) PCT No.: PCT/CN2008/001834
§ 371 (c)(1),
(2), (4) Date: Jul. 7, 2010

(87) PCT Pub. No.: WO2009/086722
PCT Pub. Date: Jul. 16, 2009

(65) Prior Publication Data
US 2011/0010468 A1    Jan. 13, 2011

(30) Foreign Application Priority Data
Jan. 7, 2008    (CN) .......................... 2008 1 0013718

(51) Int. Cl.
*G06F 15/16* (2006.01)
(52) U.S. Cl. ........................................ 709/249; 709/250

(58) Field of Classification Search .................. 709/250, 709/201, 220–223
See application file for complete search history.

(56) References Cited

U.S. PATENT DOCUMENTS

| | | | |
|---|---|---|---|
| 6,378,021 B1* | 4/2002 | Okazawa et al. | 710/317 |
| 2004/0061701 A1* | 4/2004 | Arquie et al. | 345/440 |
| 2004/0088417 A1* | 5/2004 | Bober et al. | 709/227 |
| 2005/0154831 A1 | 7/2005 | Steely, Jr. et al. | |
| 2005/0160430 A1* | 7/2005 | Steely et al. | 719/310 |
| 2007/0156972 A1* | 7/2007 | Uehara et al. | 711/146 |

FOREIGN PATENT DOCUMENTS

| | | |
|---|---|---|
| CN | 1702858 | 11/2005 |
| CN | 101216815 | 7/2008 |

* cited by examiner

*Primary Examiner* — Abdullahi Salad
(74) *Attorney, Agent, or Firm* — Knobbe Martens Olson & Bear LLP

(57) ABSTRACT

A close-coupling shared storage architecture of double-wing expandable multiprocessor is provided in the close-coupling shared storage architecture with p processors scale, the close-coupling shared storage architecture of double-wing expandable multiprocessor comprises: j processor modules PMs; wherein, each processor module is formed by coupling and cross-jointing i processors Cs, and each processor is directly connected with a node controller NC through only one link; each processor module PM comprises 2 pairing node controllers NCs, and each node controller NC is connected with the processors through m links and is connected with an interconnect network through n links; the interconnect network comprises two groups, and each group comprises k cross switch route chips NRs, each of which has q ports. By adopting the connection method above, the close-coupling shared storage architecture of double-wing expandable multiprocessor is formed. On the premise that the processor scale is kept expandable, the balance between the processor bandwidth and the network bandwidth is achieved, and the lower average delay of the interconnect network is kept simultaneously.

4 Claims, 2 Drawing Sheets

CLOSE-COUPLING SHARED STORAGE ARCHITECTURE OF DOUBLE-WING EXPANDABLE MULTIPROCESSOR

This application is U.S. National Phase of International Application PCT/CN2008/001834, filed Nov. 3, 2008 designating the U.S., and published in a language other than English as WO 2009/086722 on Jul. 16, 2009, which claims priority to Chinese Patent Application No. CN200810013718.9, filed on Jan. 7, 2008.

BACKGROUND

1. Field

The present disclosure relates to the field of computers, shared storage architectures, and particularly relates to a close-coupling shared storage architecture of a double-wing expandable multiprocessor.

2. Description of the Related Art

A close-coupling shared storage architecture can be implemented in various ways. The common architectures comprise a Symmetrical Multi-Processor (SMP) architecture and a Non-Uniform Memory Access (NUMA) architecture. If the memories are physically placed to be concentrated, and the delays that any processor accesses the concentrated memories are equal, this architecture is referred to as SMP. Currently, most of the 2~4-way Intel Xeon and Itanium systems are SMPs implemented by sharing the system bus. However, since there are limitations on the bus driving capability and the memory bandwidth, it is difficult to enlarge the scale of the SMP system, which is usually limited to a 2~8-way architecture. In a computer system with the NUMA architecture, the memories are physically distributed, the delay that the processor accesses a local memory is small, and the delay that the processor accesses a remote memory is large. The interconnection manner of the NUMA architecture is usually a two-stage interconnection. In the first stage, 2~4 CPUs are connected through a shared bus or in a direct point-to-point way, and a processor sub-system is constructed with such connected CPUs and node controllers. A bigger system is constructed by applying a customized or general interconnection network among the processor sub-systems.

For constructing a large-scale multiprocessor system, the NUMA architecture is usually required. In the design of such an architecture, there is a limitation on the increasing of the number of the ports of a cross switch route chip NR as the core of the interconnection network due to the problems of the technique and the process (currently, the maximum number of the ports is 16). On the other side, since the node controller NC is close to the processor in the physical space, and far from the interconnection network (cross switch route chip NR), the actual bandwidths on both sides of a single link are mismatched, that is, the actual bandwidth at the single link processor side is higher than the actual bandwidth at the interconnection network side.

On this premise, if the number of the processors in the system is doubled, the following two methods can be used. One method is: each node controller NC is connected to the processors via n links, and to the cross switch route chips NRs via other n links. On the basis of such connections, the close-coupling shared storage architecture with the double number of processors is constructed. Since the actual bandwidth at the single link processor side is higher than the actual bandwidth at the interconnection network side, the processor bandwidth and the network bandwidth on both sides of the node controllers NCs are mismatched, that is, this method pays the price of the mismatch between the processor bandwidth and the network bandwidth so as to obtain a low delay of the network communication.

Another method is: each node controller NC is connected to the processors via m links, and to the cross switch route chips NRs via other n links. In order to maintain the substantial match between the processor bandwidth and the network bandwidth, it is required that m<n. However, the number of the node controllers NCs would be increased obviously. Since there is a limitation on the number of the ports of a cross switch route chip NR (currently, the maximum number of the ports is 16), it is required that a interconnection network providing a larger number of ports is constructed through cascading cross switch route chips NRs, so that the network interconnection hop will be increased, that is, this method pays the price of the delay of the network communication so as to obtain the relative balance between the processor bandwidth and the network bandwidth.

When the scale of the processors is enlarged, constructing the multiprocessor close-coupling shared storage architecture by using the above methods always causes the problem of a mismatch between the processor bandwidth and the network bandwidth or the problem of increasing the average delay of the network. It seems that the bandwidth match and the interconnection hop cannot be achieved simultaneously. It is a problem that the one skilled in the art wants to solve whether or not other methods can maintain the match between the processor bandwidth and the network bandwidth and can decrease the average delay of the interconnection network when the scale of the processors is enlarged.

SUMMARY

An object of the disclosure is to provide a close-coupling shared storage architecture of a double-wing expandable multiprocessor.

The object of the present disclosure is achieved in a manner that in a close-coupling shared storage architecture of p processors, j processor modules PMs are set; wherein, each processor module PM is formed by coupling and cross jointing i processors Cs, and each processor is directly connected with a node controller NC through only one link; each processor module PM comprises two pairing node controllers NCs, and each node controller NC is connected with the processors through m links and is connected with an interconnect network through n links; the interconnect network comprises two groups, and each group is connected with k cross switch route chips NRs, each of which has q ports, so that the close-coupling shared storage architecture of double-wing expandable multiprocessor is formed.

In the architecture, the number of the processors is p=i×j; in order to achieve the non-blocking of the communication among the processors, it is required that i=2m, i.e., m=i/2; meanwhile, in order to achieve the non-blocking of the network transmission, it is required that n×j=q×k. Provided that the bandwidth of a single link for a processor is a, and the bandwidth of a single link for the network is b, since the node controllers NCs are close to the processors, the actual bandwidths are generally a>b. Thus, in order to keep the relative balance between the processor bandwidth and the network bandwidth, i.e., am=bn, it is required that m<n. On the premise that the system scale is kept highly expandable, the relative balance between the processor bandwidth and the network bandwidth is achieved, and the lower average delay of the interconnect network is kept at the same time.

The advantages of the architecture of the present disclosure are at least as follows: in the close-coupling shared storage architecture of p processors, which is constructed by connecting the processors Cs via m links, by connecting the cross switch route chips NRs via other n links, wherein m<n, meanwhile through two sets of interconnection networks on two wings of the architecture, on the premise of maintaining the high extensibility of the scale of the architecture, the relative balance between the processor bandwidth and the network bandwidth is achieved, and relatively low average delay of the interconnection network is maintained. When the advantages of the prior art are retained, the negative problems of the prior art are effectively reduced.

DETAILED DESCRIPTION

Embodiments of the present disclosure will be described with reference to the drawings as follows:

Embodiment 1

Figure 2:
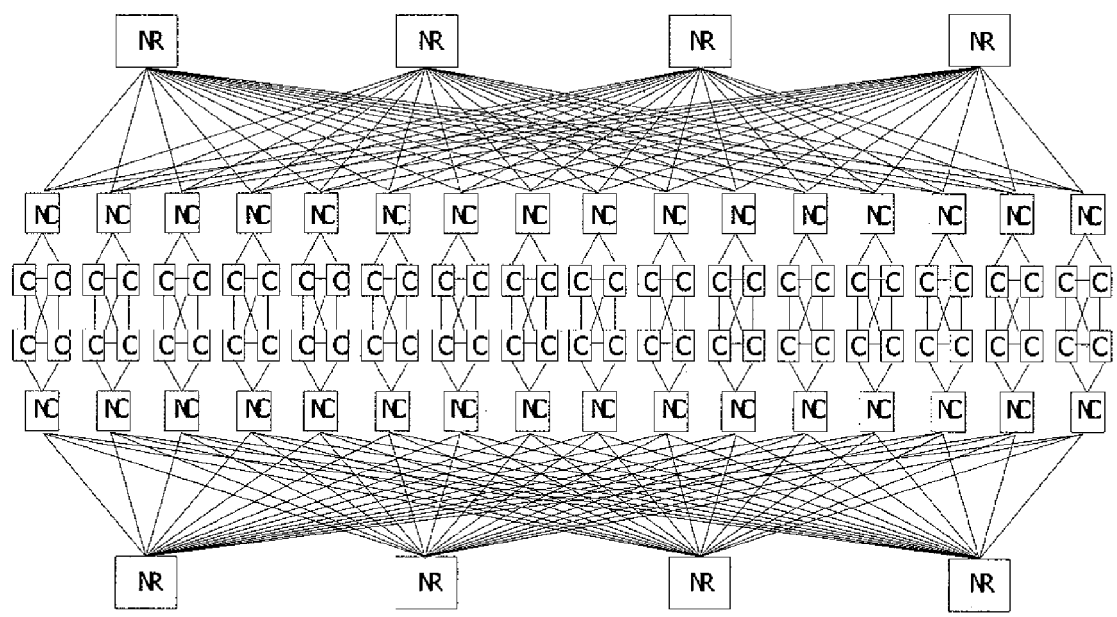
FIG. 2 is a schematic diagram of a close-coupling shared storage architecture of a double-wing expandable 64 processors.

For example, with reference to the architecture for contructing 64 processors as shown in FIG. 2, the implementation of the close-coupling shared storage architecture of a double-wing expandable multiprocessor is described.

In a close-coupling shared storage architecture with 64 processors, that is, p=64, each processor module is formed by coupling and cross-jointing 4 processors Cs, that is, i=4. Since p=i×j, the number of the processor modules (PMs) in the architecture j=p/i=16.

Each of the processor modules (PMs) comprises 2 pairing node controllers NCs, and each node controller NC is connected with the processors Cs through in links. In order to achieve the non-blocking of the communication among the processors, it is required that i=2m, i.e., m=i/2=2. That is, a single node controller NC is connected with the processors through 2 links.

Provided that the bandwidth of a single link for a processor is a, and the bandwidth of a single link for the network is b, since the node controllers NCs are close to the processors, the actual bandwidths are generally a>b. Thus, in order to keep the relative balance between the processor bandwidth and the network bandwidth, i.e., am=bn, it is required that m<n. For example, the bandwidth of a single link for a processor and the bandwidth of a single link for the network communication implemented in the prior art are 25.6 GB/s and 15 GB/s, respectively. In this case, n=am/b=25.5×2/15=3.4, the minimum integer of n satisfying the condition is 4, that is, n=4.

Each node controller NC is also connected with an interconnect network through n links; the interconnect network comprises two groups, and each group comprises k cross switch route chips NRs, each of which has q ports. In order to achieve the non-blocking of the network transmission, it is required that n×j=q×k. Due to the limitation on the technique and the process, currently, the maximum number of the ports of the cross switch route chips NRs is 16, that is, q=16. Thus, the number of the cross switch route chips NRs in the single-wing interconnection network is k=n×j/q=4×16/16=4. That is, the single-wing interconnection network comprises 4 cross switch route chips NRs. By means of above connection manner, the close-coupling shared storage architecture of double-wing expandable 64 processors is constructed.

In the following, the advantages of the architecture of the present disclosure will be described by describing the construction manners of the first method and the second method and by comparing the present disclosure with the first method and the second method.

Embodiment 2

Figure 3:
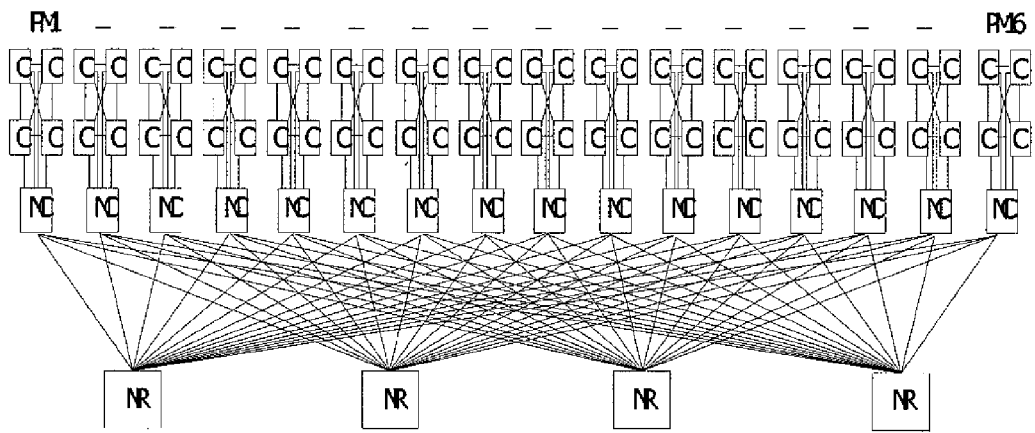
FIG. 3 is a topology diagram for constructing a close-coupling shared storage architecture of 64 processors in the prior art.

When a 32-processor system is expanded to a 64-processor system, on the premise that the number of the ports of the cross switch route chips NRs is 16, the 64-processor system is implemented by the following two methods:

One method is shown in FIG. 3, in which a single node controller NC is connected to the processors Cs via 4 links, and to the cross switch route chips NRs via other 4 links, i.e., m=n=4. Considering the non-blocking of the network transmission, it is required that n×j=q×k, k=n×j/q=4×16/16=4. That is, the number of the cross switch route chips NRs in the interconnection network is 4. Meanwhile, the bandwidth of the processor on one side of a single node controller NC is am=25.5 GB/s×4=102 GB/s, and the bandwidth of the network on the other side of the single node controller NC is bn=15 GB/s×4=60 GB/s, which causes a problem that the processor bandwidth and the network bandwidth are badly mismatched. Thus, this method pays the price of the mismatch between the processor bandwidth and the network bandwidth so as to obtain a low delay of the network communication.

Figure 4:
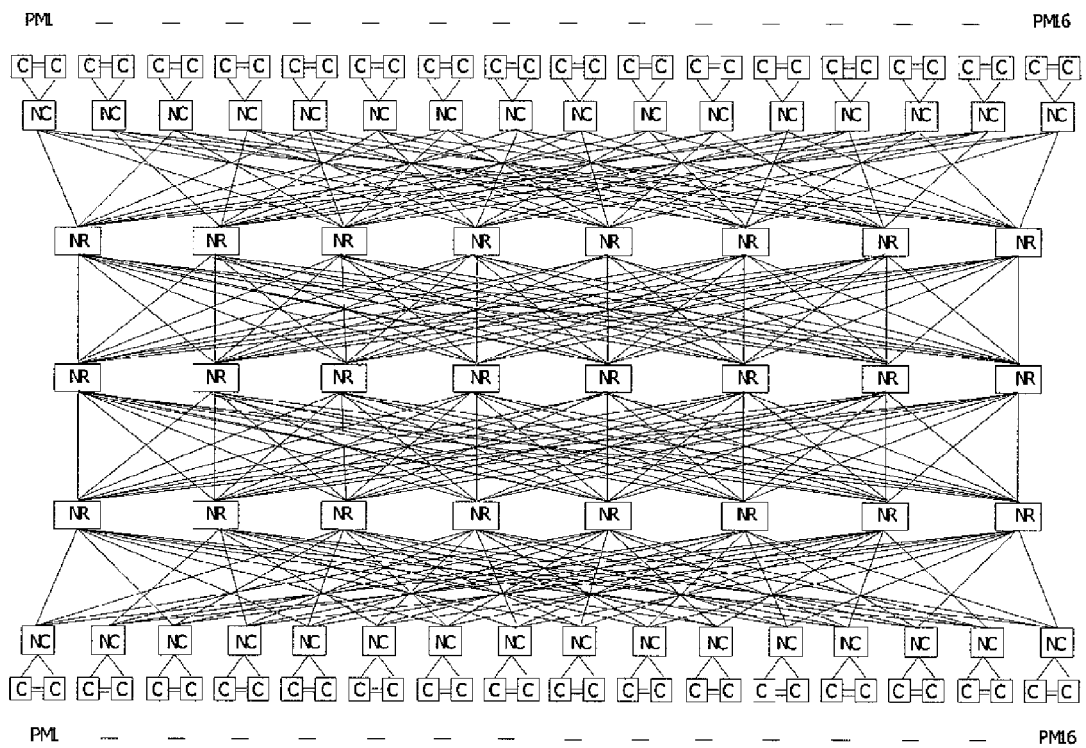
FIG. 4 is another topology diagram for constructing a close-coupling shared storage architecture of 64 processors in the prior art.

Another method is shown in FIG. 4, in which each processor module PM is formed by coupling and cross-jointing 2 processors Cs via QPI paths, that is, i=2. Since p=i×j, the number of the processor modules PMs in the architecture is j=p/i=32.

Each processor module PM comprises one node controller NC. A single node controller NC is connected to the processors via m links. In order to achieve the non-blocking of the communication among the processors, it is required that m=i=2, that is, a single node controller NC is connected to the processors via 2 links. Meanwhile, in order to keep the relative balance between the processor bandwidth and the network bandwidth, i.e., am=bn, it is required that m<n. Herein, m=2, a=25.6 GB/s and b=15 GB/s, so that the minimum integer of n satisfying the condition is 4, that is, n=4. Considering the non-blocking of the network transmission, it is required that n×j=q×k=4×32=128, that is, the interconnection network needs to provide 128 communication links. Thus, the interconnection network with 128 ports cannot be implemented by the one-stage cross switch route chip NR with 16 ports, and can only be constructed by two-stage cascading, so that the average delay of the interconnection network communication will be increased. In summary, this method pays the price of the average delay of the network communication so as to obtain the relative balance between the processor bandwidth and the network bandwidth.

In comparison with above two methods, the advantage of the architecture of the present disclosure is as follows: on the premise of maintaining the extensibility of the system from the 32-processor scale to the 64-processor scale, the relative balance between the processor bandwidth and the network bandwidth is achieved, meanwhile a relatively low average delay of the interconnection network is maintained. That is, on the basis of the feature that the relative balance between the processor bandwidth and the network bandwidth is maintained in the first method, the average delay of the interconnection network is decreased by about 50% in comparison with the second method.

Figure 1:
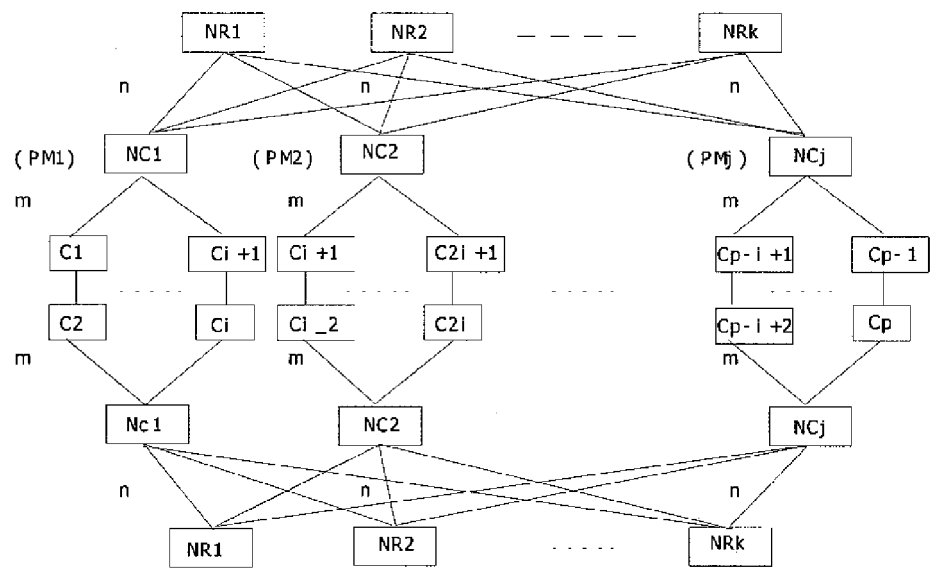
FIG. 1 is a schematic diagram of a close-coupling shared storage architecture of a double-wing expandable multiprocessor.

The method of the present disclosure is as follows:

As shown in FIG. 1, in a close-coupling shared storage architecture of p processors, j processor modules PMs are set; wherein, each processor module PM is formed by coupling and cross-jointing i processors Cs, and each processor C is directly connected with a node controller NC through only one link; each processor module PM comprises 2 pairing node controllers NCs, and each node controller NC is connected with the processors through m links and is connected with an interconnect network through n links; the interconnect network comprises two groups, and each group is connected with k cross switch route chips NRs, each of which has q ports, so that the close-coupling shared storage architecture of double-wing expandable multiprocessor is formed.

In the architecture, the number of the processors is p=i×j; in order to achieve the non-blocking of the communication among the processors, it is required that i=2m, i.e., m=i/2; meanwhile, in order to achieve the non-blocking of the network transmission, it is required that n×j=q×k. Provided that the bandwidth of a single link for a processor is a, and the bandwidth of a single link for the network is b, since the node controllers NCs are close to the processors, the actual bandwidths are generally a>b. Thus, in order to keep the relative balance between the processor bandwidth and the network bandwidth, i.e., am=bn, it is required that m<n. On the premise that the system scale is kept highly expandable, the relative balance between the processor bandwidth and the network bandwidth is achieved, and the lower average delay of the interconnect network is kept at the same time.

The meaning of the balance between the processor bandwidth and the network bandwidth is follows: when the scale of the processors is doubled, if the double-wing expandable p processors of the close-coupling shared storage architecture is constructed by connecting a single node controller NC with the processors Cs through n links and connecting the single node controller NC with the cross switch route chips NRs through other n links, although the average delay of the network communication is relatively low, the mismatch between the processor bandwidth and the network bandwidth will seriously affect the system performance. In comparison with this manner, the architecture of the present disclosure has a better property of the relative balance between the processor bandwidth and the network bandwidth.

The meaning of the lower average delay of the interconnect network is as follows: when the scale of the processors is doubled, if the close-coupling shared storage architecture of p processors is constructed by connecting a single node controller NC with the processors Cs through m links and connecting the single node controller NC with the cross switch route chips NRs through other n (m<n) links, although the processor bandwidth and the network bandwidth are relatively balanced, an interconnection network with more ports have to be constructed by cascading the cross switch route chips NRs so that the average delay of the interconnection network is increased. In comparison with this manner, the method and architecture of the present disclosure have lower average delay of the interconnection network.

What is claimed is:

1. A close-coupling shared storage architecture of double-wing expandable processors, comprising:
   at least J processor modules comprised in a close-coupling shared storage architecture of at least P processors;
   wherein each processor module is formed by coupling and cross-jointing at least I processors, and each processor is directly connected with a node controller through only one link;
   wherein each processor module comprises two pairing node controllers, and each node controller is connected with one or more of the processors through at least M links and is connected with one or more cross switch route chips of an interconnect network through at least N links; and
   wherein the interconnect network comprises two groups on two wings of the architecture, and each group is connected with at least K cross switch route chips, each of which has at least Q ports;
   wherein the number of the at least P processors is P=I×J;
   wherein to achieve a non-blocking of communications among the at least I processors I=2×M;
   wherein to achieve a non-blocking of network transmissions N×J=Q×K;
   wherein a bandwidth of a single link for a processor is at least A, and a bandwidth of a single link for the interconnect network is at least B, where A>B;
   wherein to keep the relative balance between processor bandwidth and network bandwidth M<N; and
   wherein the close-coupling shared storage architecture of the processors is constructed on the premise of maintaining high extensibility of system scales, the relative balance between the processor bandwidth and the network bandwidth is achieved, and relatively low average delay of the interconnection network is maintained simultaneously.

2. A close-coupling shared storage architecture of double-wing expandable processors, comprising:
   an interconnect network comprising two groups, wherein each group is connected with at least K cross-switch route chips and each cross-switch route chip includes at least Q ports;
   at least P processors; and
   at least J processor modules, wherein each of the at least J processor modules comprises:
      at least I coupled and cross-jointed processors, wherein each of the at least I coupled and cross-jointed processors is directly connected with a node controller through only one link, and
      two pairing node controllers, wherein each node controller is connected with one or more of the at least I coupled and cross-jointed processors through at least M first links and is connected with one or more cross-switch route chips of a group of the interconnect network through at least N second links;
   wherein the number of the at least P processors is P=I×J;
   wherein to achieve a non-blocking of communications among the at least I coupled and cross-jointed processors I=2×M;
   wherein to achieve a non-blocking of network transmissions N×J=Q×K;
   wherein a bandwidth of a single first link is at least A, and a bandwidth of a single second link is at least B, where A>B; and
   wherein to keep the relative balance between processor bandwidth and network bandwidth M<N.

3. The close-coupling shared storage architecture of claim 1, wherein each of A, B, I, J, K, M, N, P, and Q is a positive integer.

4. The close-coupling shared storage architecture of claim 2, wherein each of A, B, I, J, K, M, N, P, and Q is a positive integer.

* * * * *